US009098833B2

(12) United States Patent
Yaqub

(10) Patent No.: US 9,098,833 B2
(45) Date of Patent: Aug. 4, 2015

(54) POPULATING AND MANAGING (PAM) CONTACT INFORMATION IN THE NETWORK ADDRESS BOOK (NAB)

(75) Inventor: Raziq Yaqub, Stewartsville, NJ (US)

(73) Assignees: TOSHIBA AMERICA RESEARCH, INC., Piscataway, NJ (US); TELCORDIA TECHNOLOGIES, INC., Piscataway, NJ (US)

(*) Notice: Subject to any disclaimer, the term of this patent is extended or adjusted under 35 U.S.C. 154(b) by 462 days.

(21) Appl. No.: 12/365,758

(22) Filed: Feb. 4, 2009

(65) Prior Publication Data

US 2009/0216725 A1 Aug. 27, 2009

Related U.S. Application Data

(60) Provisional application No. 61/025,957, filed on Feb. 4, 2008, provisional application No. 61/035,036, filed on Mar. 10, 2008.

(51) Int. Cl.
| | |
|---|---|
| G06F 17/30 | (2006.01) |
| G06Q 10/10 | (2012.01) |
| G06Q 30/02 | (2012.01) |

(52) U.S. Cl.
CPC ............. *G06Q 10/107* (2013.01); *G06Q 30/02* (2013.01)

(58) Field of Classification Search
CPC .............................. G06Q 10/107; G06Q 30/02
USPC .................................. 707/758, 783; 709/206
See application file for complete search history.

(56) References Cited

U.S. PATENT DOCUMENTS

| | | | |
|---|---|---|---|
| 7,177,880 B2* | 2/2007 | Ruvolo et al. ........................ 1/1 |
| 7,277,911 B2 | 10/2007 | Cheah | |
| 8,300,780 B1* | 10/2012 | Davis ......................... 379/88.19 |
| 2004/0122855 A1* | 6/2004 | Ruvolo et al. ............. 707/104.1 |
| 2004/0225525 A1* | 11/2004 | Weitzman ......................... 705/1 |
| 2005/0149487 A1 | 7/2005 | Celik | |
| 2006/0027648 A1* | 2/2006 | Cheah ........................... 235/381 |
| 2006/0052113 A1 | 3/2006 | Ophir | |
| 2006/0080284 A1* | 4/2006 | Masonis et al. ................... 707/3 |
| 2007/0106728 A1* | 5/2007 | Adams et al. ................. 709/206 |
| 2007/0106733 A1* | 5/2007 | Ramanathan et al. ........ 709/206 |

(Continued)

OTHER PUBLICATIONS

Search Report relating to international application No. PCT/US 09/00715.

*Primary Examiner* — Shew-Fen Lin
(74) *Attorney, Agent, or Firm* — Westerman, Hattori, Daniels & Adrian, LLP

(57) ABSTRACT

This paper proposes a new method and architecture for populating, updating and managing the NAB. It also proposes user's Contact Information Discovery (CID). In context of populating the NAB; since the NAB of each individual subscriber will be stored in the network in future, the paper proposes CI to flow from one NAB to another NAB within the core network, instead of CI flowing from Device to Network. Thus with the user authorization, his CI would shoot from one NAB to another NAB within the core network instead of from LAB to NAB through air interface. It would reduce huge amount of data traffic on the air that otherwise would be generated in updating and populating the NAB by all the NAB users. In context of CID, the paper proposes a query-response mechanism and introduces a NAB Manager. The new architecture will provide several benefits for example it will eliminate the need of "Number Portability," "United States National Do Not Call Registry" and "411 Directory Assistance."

24 Claims, 10 Drawing Sheets

Architecture for Populating and Managing (PAM) Contact Information in NAB

(56) References Cited

U.S. PATENT DOCUMENTS

| | | | |
|---|---|---|---|
| 2007/0189503 A1* | 8/2007 | Pearson et al. | 379/355.04 |
| 2007/0276911 A1 | 11/2007 | Bhumkar | |
| 2009/0028179 A1* | 1/2009 | Albal | 370/465 |
| 2009/0150488 A1* | 6/2009 | Martin-Cocher et al. | 709/204 |
| 2009/0182821 A1* | 7/2009 | Allen et al. | 709/206 |
| 2009/0215486 A1* | 8/2009 | Batni et al. | 455/550.1 |
| 2010/0241719 A1* | 9/2010 | Agundez Dominguez et al. | 709/206 |

* cited by examiner

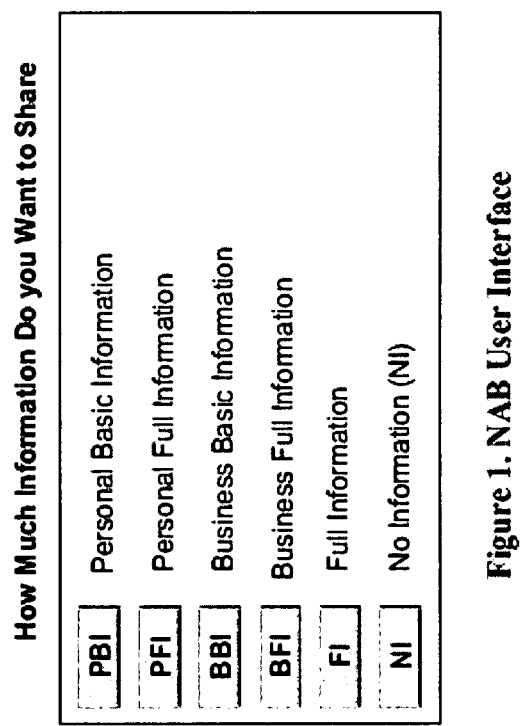
Figure 1. NAB User Interface

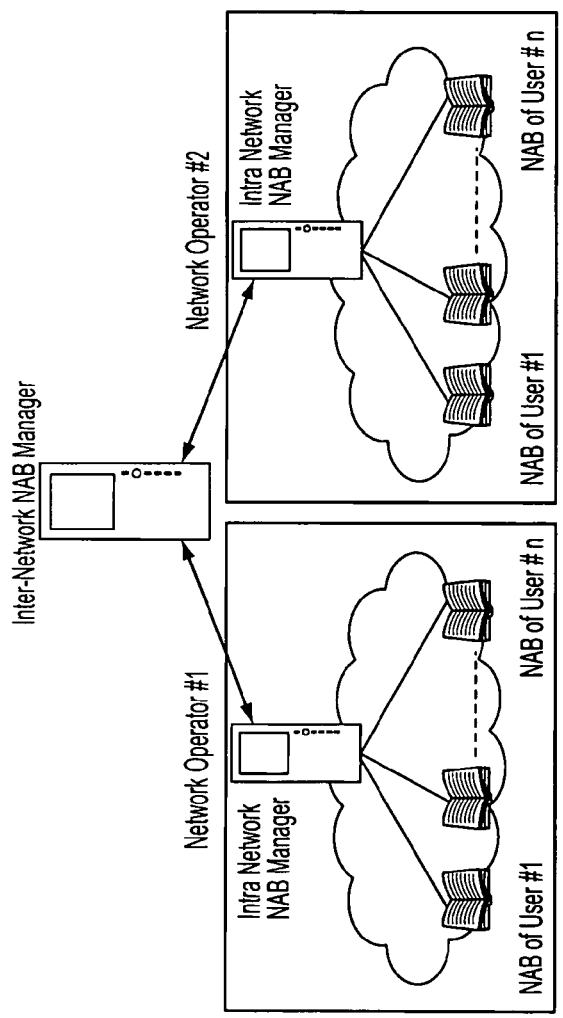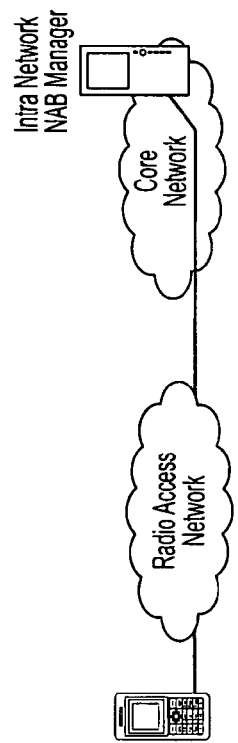

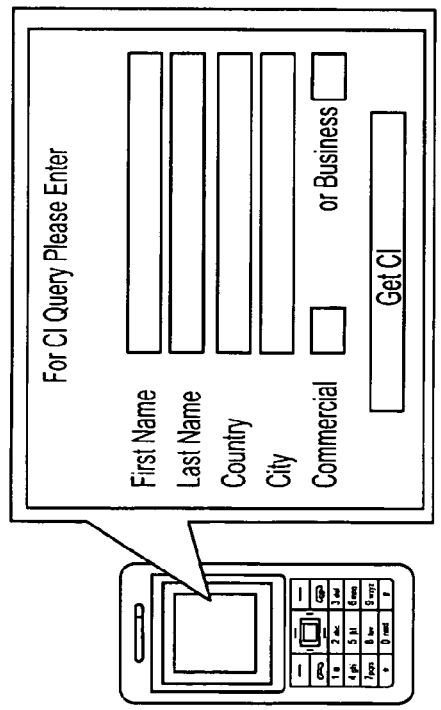
FIG. 3
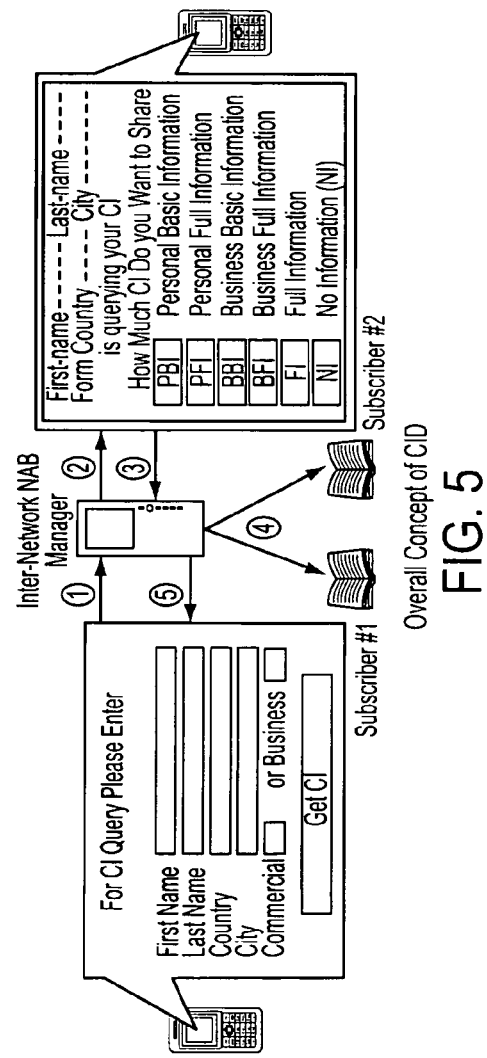
FIG. 4
FIG. 5

Figure 6 NAB-Manager in SAE Architecture.

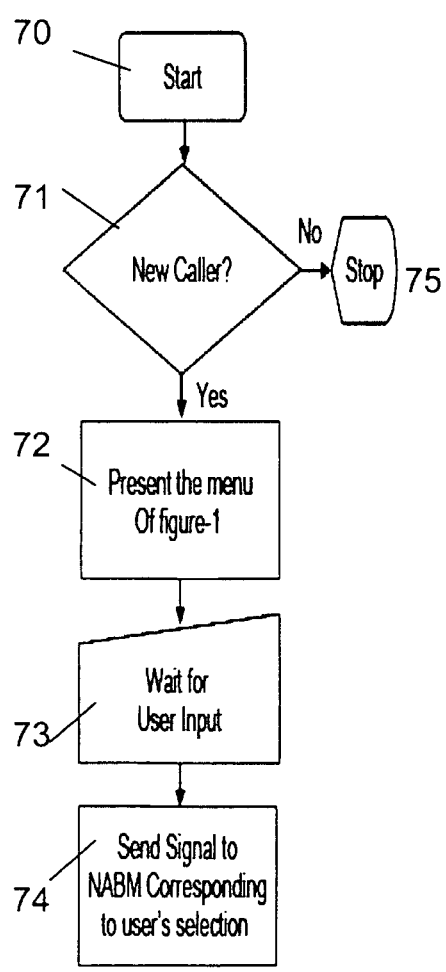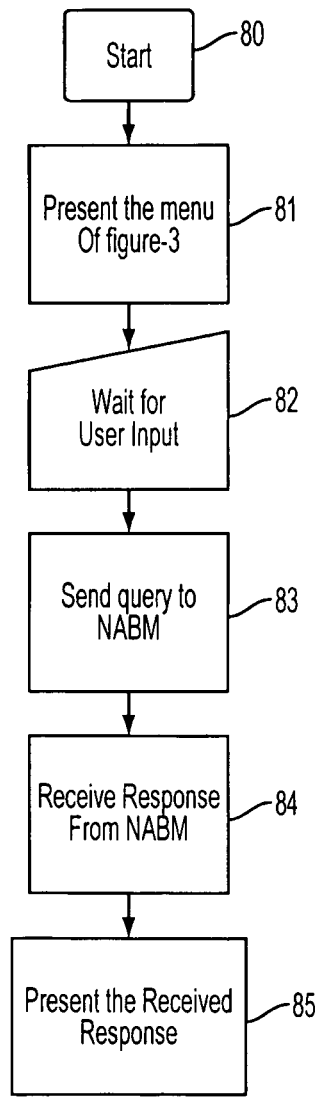
Populating, Updating and Managing the NAB
FIG. 7
Content Information Discovery (UE Side)
FIG. 8

Updating the Content Information in Respective NABS

Content Information Discovery and Provision (Network Side)

How Much Information would you like to Share

| PBI 1 | BBI 2 | PBI+BBI 3 |
|---|---|---|
| PFI 4 | BFI 5 | PFI+BFI 6 |
| FI 7 | xxx 8 | xxx 9 |
| xxx * | NI 0 | xxx # |
| Change existing selection i.e.  to new selection as default, i.e. | | ---- X ---- * |

NAB User Interface (For Populating the NAB)

Legend

| PBI | Personal Basic Information |
|---|---|
| PFI | Personal Full Information |
| BBI | Business Basic Information |
| BFI | Business Full Information |
| FI | Full Information |
| NI | No Informaiton (NI) |
| xxx | Left open, can be defined as the need felt |

(Alternative to embodiments shown in FIG. 1)

FIG. 12

LAB has Limited Memory
What Information about stored contacts in the NAB
would you Like to Synchronize with LAB

| PBI 1 | BBI 2 | PBI+BBI 3 |
| PFI 4 | BFI 5 | PFI+BFI 6 |
| FI 7 | xxx 8 | xxx 9 |
| xxx * | NI 0 | xxx # |

Legend

| PBI | Personal Basic Information of all the contacts in my NAB |
| PFI | Personal Full Information of all the contacts in my NAB |
| BBI | Business Basic Information of all the contacts in my NAB |
| BFI | Business Full Information of all the contacts in my NAB |
| FI | Full Information of all the contacts in my NAB |
| NI | No Informaiton (NI) of the contacts in my NAB |
| xxx | Left open, can be defined as the need felt |

. NAB User Interface (For Synchronizing the NAB)

FIG. 14

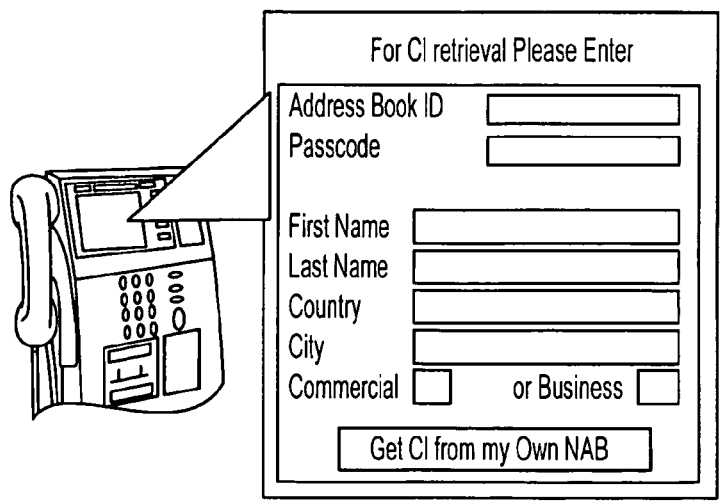

CI Query Template to get CI from own NAB if
Unregistered device (e.g. Public phone) is used by the NAB user

FIG. 15

POPULATING AND MANAGING (PAM) CONTACT INFORMATION IN THE NETWORK ADDRESS BOOK (NAB)

BACKGROUND

1. Field of the Invention

The present application relates generally to management of a network address book for telephones and/or the like.

2. General Background Discussion

According to the background art, an Address Book, containing contact information of friends, relatives, buddies, etc., is stored in a user cell phone or other user device (either in, e.g., SIM (subscriber identity module), or in the Device Memory). In this regard, this information is stored in the Address Book by the owner of the device by the following methods:

1. Keying in full information (e.g., Name, Phone No., etc.) using phone keypad;
2. Keying in partial information (e.g., Name only) at the end of a call, associating with the caller ID, if the caller ID is permitted by the operator and the phone is programmed to retain it.

The Address Book that resides in the device memory is not convenient to move from one device to another. For example, if the user wants to switch to a new model of a cell phone, he has to copy the Address Book from an old device to the new device, either manually or by using a computer and an allied software application that can perform a functionality of retrieving the contact information from a first (e.g., old) device and storing it into a second (e.g., new) device.

The Address Book that resides in the SIM is relatively easy to move from one device to another because the SIM can be removed from one device and inserted into the other device. However, a SIM has limited memory capacity.

Recently, the Open Mobile Alliance (OMA) Converged IP Messaging (CPM) has discussed storing each subscriber's Address Book in the network, giving it the name Network stored Address Book (NAB)). A NAB could not only eliminate the problem of shifting the Address Book from one device to another, but could also allow the Address Book to be accessed and be used by a plurality of devices (such as, e.g., a personal computer (PC), Universal Mobile Telecommunications System user equipment (UE), a pocket computer, etc.) possessed by the same user. The user will be able to download the NAB into any of his devices, update the contents, and synchronize the information in both the user's Local Address Book (LAB) (i.e., on the user's device) and the NAB, etc. For reference, user equipment (UE) can involve any device used by an end user to communicate, such as, e.g., a cellular phone, a personal digital assistant, a lap-top computer and/or any other appropriate user equipment.

However, under the Open Mobile Alliance (OMA) framework, populating the NAB would still be performed by using the existing methods 1 and 2 as noted above—i.e., any new contact information would be entered by the user himself into the LAB, and then it would be uploaded to update the NAB.

U.S. Pat. No. 7,277,911 to Cheah proposes some new ideas on an information management and distribution system. However, the preferred embodiments differ from Cheah in a variety of aspects. For example: (i) The Cheah information management and distribution system is apparently primarily an Internet application and maybe implemented using a computer readable medium, and a computer system whereas the preferred embodiments of the present invention are preferably for telephone networks (e.g., landlines and cellular networks); (ii) the Cheah system requires the acts of registering a plurality of users, with each of the users providing a contact profile during registration process, whereas the preferred embodiments herein do not necessitate such a requirement, (iii) the Cheah system is apparently for electronically distributing contact information (CI) over a computer network, whereas the preferred embodiments herein are not only for distributing the CI in controlled manner but also for populating and managing the NAB information in a seamless manner, and (iv) some of the aspects pertaining to the CI management, distribution and automatic update of the previously distributed contact information according to some embodiments in this application are more efficient than the background art, because, e.g., in the case of the background art, the management is provided by a $3^{rd}$ party, whereas the preferred embodiments herein do not require such a $3^{rd}$ party and the management is done directly by the entities in the operator's network, e.g., involving a new entity called "NAB Manager" and a new Interface called "Sn-ab" over which the UE would be able to communicate with the NAB Manager.

In addition, the preferred embodiments also provide a NAB Manager to communicate with a Subscription Profile Database, e.g. HSS in 3GPP Cellular networks and PCRF (or Policy Charging and Rules Function) as shown in FIG. 6.

Other aspects and advantages of the preferred embodiments of the present invention will become apparent from the following detailed description taken in conjunction with the accompanying drawings which illustrate, by way of example, the principles of the invention according to some of the preferred embodiments.

SUMMARY OF THE PREFERRED EMBODIMENTS

The preferred embodiments overcome above-noted and/or other problems in the background art.

In some embodiments, the following terminology is employed.

Contact Information (CI): CI can include personal, business and/or other information and/or data (e.g., name, date of birth, file(s) or document(s), etc.) and/or other information pertinent to an entity or an individual;

Personal Contact Information: can include, e.g., Home Phone, Facsimile Number, Cellular Phone Number, E-mail Address, Postal Address, Website Address and/or any information related to one's personal life, etc.;

Business Contact Information: can include, e.g., Office Phone, Facsimile Number, Cellular Phone Number, E-mail Address, Postal Address, Website Address and/or any information related to one's business life, etc.;

Address Book (AB) or Local Address Book (LAB): AB/LAB can include a computer or software book containing CI and that is stored locally in a user device (such as, e.g., a phone (e.g., a mobile phone), a PDA, a computer, or even a local server belonging to an individual, a corporation, or another entity);

Network Address Book (NAB): NAB preferably is a computer or software book containing CI, and stored remotely in a network. A NAB is also referred to as a Converged Address Book (CAB) in relation to, e.g., Open Mobile Alliance.

The preferred embodiments provide new methods and architectures for populating, updating and/or managing a NAB.

The preferred embodiments also provide a novel approach for user's Contact Information Discovery (CID). In the context of populating a NAB, since the NAB of each individual subscriber will be stored in the network, the preferred embodiments propose that CI flows from one NAB to another NAB within the core network or across networks, instead of CI only flowing from Device to Network. Thus, with the user authorization, the user's CI would be transmitted from one NAB to another NAB within the core network instead of only from the LAB on the user's device to the NAB through an air (e.g., wireless) interface. Or, in case the CI has to flow from the user's LAB to the NAB (i.e., Device to Network) through the air (such as, e.g., for synchronization of both LAB and NAB, or for any purpose), the device would preferably be smart enough to do so only if the cheaper access network is available (e.g., if WiFi is listed as the cheapest access in the User's policy from among several available access choices e.g. Cellular, WiMAX, or any other, the device will synchronize download/upload when WiFi becomes available). Or, in the case of non availability of cheaper access (e.g., WiFi), and availability of pricy air interface (e.g., cellular) the network would preferably send an advice of charge before actually starting the synchronizing of contacts.

Among other things, the preferred embodiments can reduce or optimize a huge amount of data traffic over the air that otherwise would be generated in updating and populating their respective NAB by all the NAB users. In the context of Contact Information Discovery (CID), the preferred embodiments of the present application propose a query-response mechanism and introduce a NAB Manager. The new architecture can provide a variety of benefits. For example, it can eliminate the need of "Number Portability," of a "United States National Do Not Call Registry," and of a "411 Directory Assistance." Moreover, the new architecture also provides a platform for social networking, and for advertising.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 1 is a diagram showing an illustrative NAB user interface according to some illustrative embodiments;

FIG. 2A is a diagram showing an illustrative architecture for populating and managing contact information in a network access book according to some illustrative embodiments;

FIG. 2B is a diagram showing another illustrative architecture for populating and managing contact information in a network address book according to some illustrative embodiments;

FIG. 3 is a diagram showing an illustrative CI Query Template according to some illustrative examples;

FIG. 4 is a diagram showing an illustrative CI Query Response Template according to some illustrative examples;

FIG. 5 is a diagram showing an overall concept of CID according to some illustrative examples;

FIG. 7 is a diagram showing method steps related to populating, updating and managing a NAB according to some illustrative examples;

FIG. 8 is a diagram showing method steps related to Content Information Discovery according to some illustrative examples;

FIG. 12 is a diagram showing an illustrative NAB user interface according to some illustrative embodiments (alternative to the embodiment shown in FIG. 1);

FIG. 14 is an illustrative NAB user interface according to some embodiments; and FIG. 15 is a diagram depicting presenting of a menu to a individual using a device of another individual or using a public device.

DETAILED DESCRIPTION OF THE PREFERRED EMBODIMENTS

Figure 6:
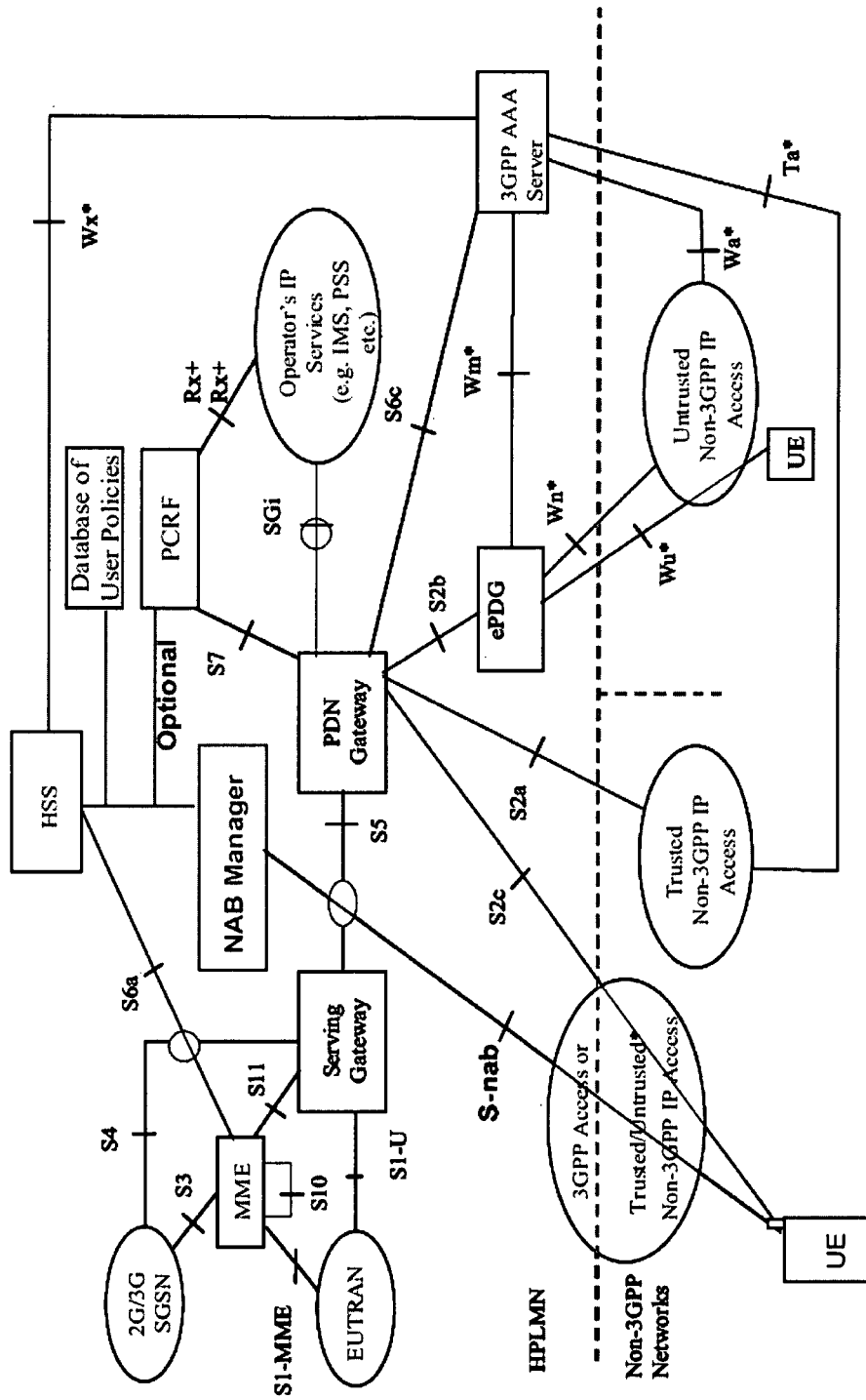
FIG. 6 is a diagram showing a NAB-Manager in SAE Architecture according to some illustrative examples.

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

1.0 The Preferred Embodiments 1.1 Populating, Updating and Managing the NAB

Since the NAB of each individual subscriber will be stored in the network, in the preferred embodiments contact information (CI) flows from one NAB to another NAB within the core network or across networks, instead of having CI only flowing from a user device to a network (e.g., from a device's LAB to a network's NAB) through an air interface. Thus, e.g., with a user's authorization, one user's CI would be transmitted from one NAB to another within the core network. Or in case the CI has to flow from user's LAB to NAB (I.e Device to Network) through an air, (e.g. for synchronization of both LAB and NAB, or for any purpose), the device would be smart enough to do so only if the cheaper access network is available (e.g. if WiFi is listed as the cheapest access in the User's policy from among several available access choices e.g. Cellular, WiMAX, or any other, the device will synchronize download/upload when WiFi becomes available). Or in case of non availability of cheaper access (i.e. e.g. WiFi), and availability of pricy air interface (e.g. cellular) the network would send an advice of charge before actually starting the synchronizing of contacts. Here, the data can, e.g., be transmitted via a wired medium (e.g., wires, circuitry, optical fibers, etc.) rather than wireless within the core network. This, would, e.g., reduce or optimize or eliminate the mis-use of precious air interface resources by generating a huge amount of data traffic on the air for updating, synchronizing and populating the NAB by all the NAB users. For reference, a core network includes the central part of a telecom network that provides, e.g., assorted services to customers who are connected by the access network, such as, e.g., 1) aggregation, 2) authentication, 3) call control/switching, 4) charging (such as, e.g., pre-paid charging, postpaid charging), 5) service invocation, 6) gateways to access other networks, 7) subscriber database(s) (e.g., core network also host subscribers databases, such as, e.g., HLR in GSM systems), which subscriber database(s) are accessed by core network nodes for functions like authentication, service invocation, etc.

According to the preferred embodiments, the NAB would have various levels of settings governing how much information is to be transferred from a NAB of one user to the NAB of another, based on how much CI one user wants to share with the other. In some illustrative and non-limiting examples, the levels can be categorized, such as, e.g., using exemplary, non-limiting categories as follows:

Personal Basic Information (PBI): In some examples, this could allow very basic information to be transferred from one NAB to the other NAB (such as, e.g., Name and Phone Number or any basic information related to one's personal life).

Personal Full Information (PFI): In some examples, this could allow additional personal information other than basic information to be transferred from one NAB to the other NAB (such as, e.g., Home Phone Number, Facsimile Number, Cell Phone Number, E-Mail addresses, Web Site Addresses, Important Dates (such as, e.g., Birthdays, Anniversary, etc.), hobbies, interests, or any information related to one's personal life etc.).

Business Basic Information (BBI): In some examples, this could allow very basic Business Information to be transferred from one NAB to the other NAB (such as, e.g., Name and Business Phone Number only).

Business Full Information (BPI): In some examples, this could allow additional business information other than basic information to be transferred from one NAB to the other NAB (e.g., Office Phone Number, Facsimile Number, Cell Phone Number, Postal Address, Web Site Address, or any information related to one's business life etc.).

Full Information (FI): In some examples, this would allow all the contents (any information related to one's personal life and business life) to be transferred from one NAB to the other NAB.

No Information (NI): In some examples, this would allow nothing to be transferred from one NAB to the other NAB.

FIG. 12 shows an illustrative NAB User Interface for populating the NAB according to some preferred embodiments. In this regard, in some embodiments, a click response from the called party (cellular or fixed line subscriber), would generate a or message (such as, in some examples, and send that message to the NAB Manager. In some embodiments, this would cause the desired amount of information to be transferred and/or shared from one NAB to the other NAB within the network. It would save the user, from saving the CI first on his LAB, then synchronizing uploading onto his NAB, and then also synchronizing the information in two ABs. In some embodiments, for a better user experience, the user policy can eliminate or limit the presentation of a menu such as, e.g., shown in FIG. 12. Thus, if, e.g., a default policy is to save a new callers' contact information, said menu would not be presented, rather the contact information can be saved transparently. The reverse is also true—i.e., if the default policy is to not save new callers' contact, said menu would not be presented, and the contact information would not be saved. This can be further explained by the following use case. Consider a hotel reservation, where every caller has a probability of being a new caller. In some examples, the NAB can be set to, e.g.;

1. To save new callers' contact, said menu would not be presented to the callee, rather the contact information will be saved transparently in the callee's NAB.
2. Not to save new callers' contact information, said menu would not be presented to the callee, and the contact information will not be saved in the callee's NAB.
3. To ask each time a new caller calls, the said menu would be presented each time For bullets 1 and 3 above, the caller's profile would be saved in the NAB, and the NAB could be synchronized with a LAB or with the reservation system. Thus, neither a guest (e.g., making a reservation) would have to dictate his profile nor would the reservation manager have to type in the guest information. This would facilitate the reservation process.

In some other embodiments, with reference to, e.g., step 72 shown in FIG. 7, at the end of the call from a new caller (i.e., from a new caller that is one not in the address book), or after retrieving message recorded by the new caller from the mail server, the menu shown in FIG. 1 can preferably pop up on the user's device. The user could then select the desired response via its device user interface (e.g., clicking on the desired response).

Upon receiving the response from the calling or called party (cellular or fixed line subscriber), the NAB Manager would transmit and share the desired amount of information from one NAB to the other NAB within the network. Among other things, this method helps the user to avoid having to save the CI first on his LAB, then upload it onto the NAB, and also synchronize the information in two Address Books. In some embodiments, a user is provided with a means to establish user preferences whereby, e.g., the NAB Manager will transmit and share certain information with certain users automatically without requiring user input into a menu such as, e.g., shown in FIG. 1 (such as, e.g., automatically allowing Business Basic Information or the like without a menu appearing).

To perform and mange the above noted NAB related functions, the preferred embodiments provide a NAB Manager as shown in FIG. 2A. In the preferred embodiments, the NAB Manger is responsible for managing all the functions pertaining to CI transfer, from one NAB to the other. These functions can include, e.g., a) sending a Menu to both calling and called parties when the call terminates (in another implementation, the user device can also be made capable of generating this menu by default at the end of the call received from a new caller), b) authentication, and c) authorization of secure CI transfer. In some preferred implementations, a NAB Manager would reside in a Telecommunication Services Providers' Network.

The NAB Manager can operate as an Intra-NAB Manger if it is responsible for the management of NABs within one operator's network. On the other hand, the NAB Manager can operate as an Inter-NAB Manger, if its jurisdiction is to communicate with NABs across different operator's network. See, e.g., Inter-Network NAB and Intra-Network NAB examples shown in FIG. 2A. Thus, e.g., an Inter-Network NAB could manage or transfer the CI from a NAB resident in one network to a NAB residing in another network, such as, e.g., network of Network Operator #1 and network of Network Operator #2 shown in FIG. 2A. Thus, the NAB can include, e.g., language translating capabilities. For example, in some embodiments, contact information can be translated from one spoken language (e.g., English) to another (e.g., German).

Inter-Network and Intra-Network NAB Managers can also accommodate policies for verification of service access privileges, end-user preference, and personalization. In some embodiments, they can be configured to either run the NAB related policies autonomously or to be interfaced with a Policy Server of the network. In preferred embodiments, the NAB managers' hierarchy can be established to best manage the services.

To facilitate reference, FIG. 7 is a diagram showing illustrative method steps related to populating, updating and managing a NAB according to some illustrative examples. As shown, the process starts at step 70 (e.g., at some time during a call between a caller and a callee). At step 71, the system renders a decision as to whether or not it is a new caller. If the answer is "no," the system goes to step 75 and stops. If the answer is "yes," the system goes to step 72 and presents an appropriate menu to the user (such as, e.g., the menu of FIG. 1 in this example). Next, at step 73, the system waits for user input. Then, at step 74 the system sends a signal to the NAB Manager corresponding to the user's selection. In some preferred embodiments, these functions are performed by the user's device, e.g., UE.

1.2 Content Discovery

In the preferred embodiments, the architecture described above can also be configured for Content (e.g., Contact) Information Discovery (CID). In this regard, in some embodiments, when a user would be looking for a CI of his buddy, relative, or a business, the UE will preferably present him a pop-up menu like that shown in FIG. 3. It should be appreciated that this is an exemplary menu and it could be modified to best meet the users' needs. In this example, the user will fill the maximum information known by him (such as, his name, his city, or his hobby/personal interest etc e.g., by typing or keying in the text using an UE alphanumeric key-pad, by speech recognition technology, or by any other user entry mechanisms as known in the art) and will send a query.

The query will be sent to NAB Manager as shown in step 1 of FIG. 5 (see the encircled 1) and at step 83 in FIG. 8. The NAB Manager would process the request and find out the CI of the Subscriber In Question (SIQ) using the information provided by the inquirer. In some embodiments, the NAB Manager can consult NABs, Subscription Profile Database(s), Policies Database(s) and/or Policy and Charging Rules Function (PCRF) to find the inquired information. If the NAB Manager successfully finds the CI of Subscriber In Question (SIQ) in the database, it can send an authorization message to SIQ as shown in step 2 of FIG. 5 (see the encircled 2). In some preferred embodiments, this would result to pop up the menu shown in FIG. 4 on the SIQ's UE.

Subscriber In Question's (SIQs) will preferably choose the response that will be sent to NAB Manager as shown in step 3 of FIG. 5 (see the encircled 3).

Based on the SIQ's willingness and the amount of information the SIQ desires, the NAB Manger shall respond to a specific query. It would also be capable of limiting the type or amount of the information to be provided to an inquirer (depending on a user's default policy and/or preference or operator's policy or both, etc.), and forward to the inquirer in the response message as shown in step 4 of FIG. 5 and FIG. 10.

Figures 9, 10:
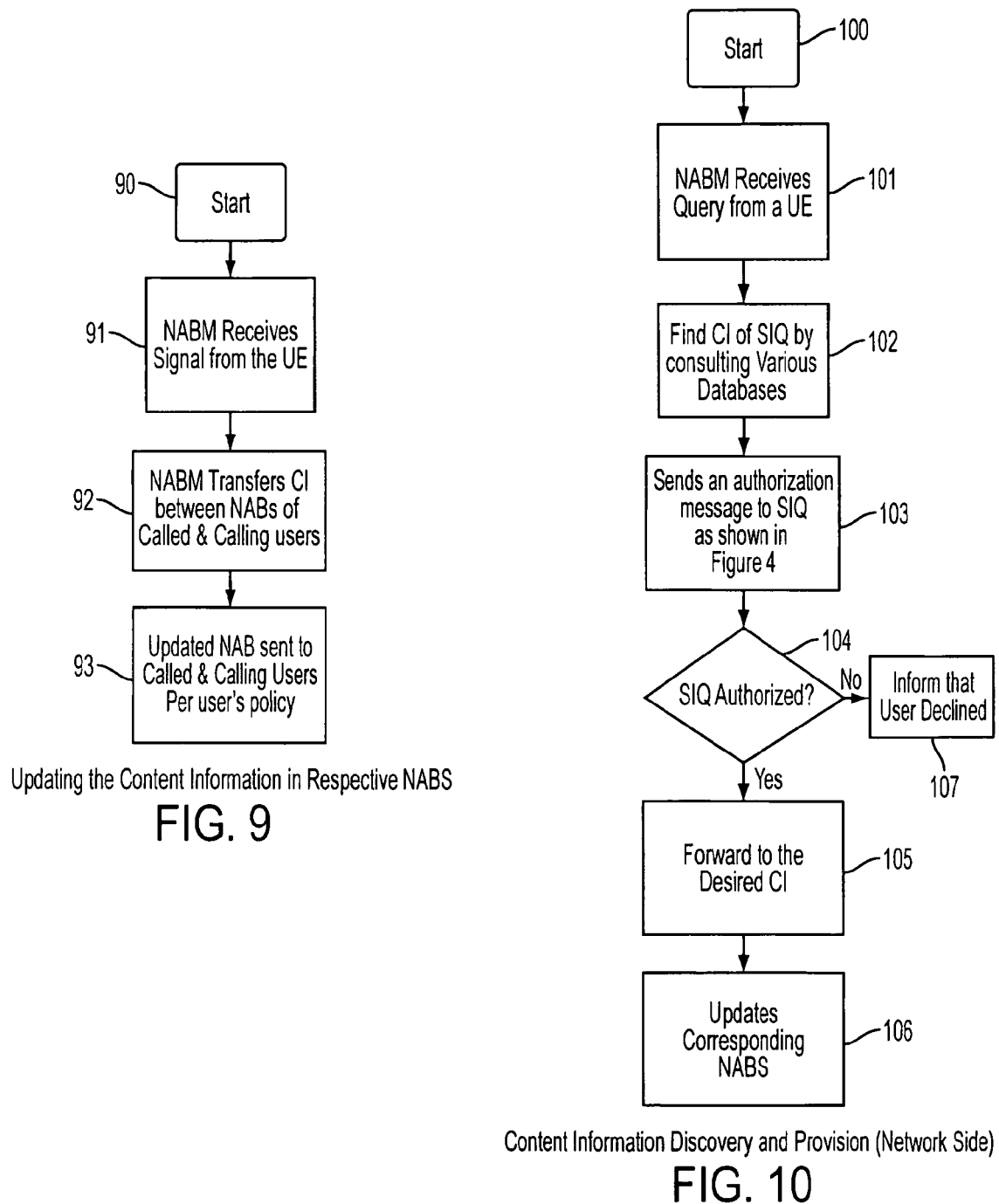
FIG. 9 is a diagram showing method steps related to updating Content Information in a respective NAB according to some illustrative examples.
FIG. 10 is a diagram showing method steps related to Content Information Discovery and Provision (Network Side) according to some illustrative examples.

At the end of the call, the NAB Manger will also save the information in the each other's NAB as shown in step 5 of the FIG. 5 (see the encircled 5) and in FIG. 9. Thus, with the user authorization, one user's CI would be transmitted from one NAB to another within the core network. Thus, in the preferred embodiments, various of the functions of the NAB, rather than being carried through communication between UE and the network, can be carried in the core network, and the system can reduce a huge amount of data traffic on the air that otherwise would be generated in updating and populating the NAB by all of the NAB users. Or in case the CI has to flow from user's LAB to NAB (I.e Device to Network) through an air, (e.g. for synchronization of both LAB and NAB, or for any purpose), the device would be smart enough to do so only if the cheaper access network is available (e.g. if WiFi is listed as the cheapest access in the User's policy from among several available access choices e.g. Cellular, WiMAX, or any other, the device will synchronize download/upload when WiFi becomes available). Or in case of non availability of cheaper access (i.e. e.g. WiFi), and availability of pricy air interface (e.g. cellular) the network would send an advice of charge before actually starting the synchronizing of contacts. In some embodiments, the user can have an option of saving the CI either permanently or for certain desired period of time. In some embodiments, the user can have an option to receive—e.g., for receiving updates pertaining to changes to that contact. In some embodiments, the user can also have the option to display his CI (preferably, being capable of limiting the display to a desired manner) into the NAB(s) of other users.

In the preferred embodiments, a significant component in the network receiving the queries and responding back accordingly is the "NAB-Manager." For reference, FIG. 5 helps to demonstrate how an NAB Manager can be, e.g., populated in some illustrative examples, as would be understood by those in the art based on this disclosure.

To facilitate reference, FIG. 8 is a diagram showing illustrative method steps related to Content Information Discovery according to some illustrative examples. As shown in FIG. 8, the system starts at step 80 (such as, e.g., upon a user's voice activation, or clicking on a start button or some other means to start this functionality). Upon such activation or starting, at step 81 the system presents a menu to the user (such as, e.g., the menu shown in FIG. 3 in this example). Then, at step 82, the system waits for the user's input. Next, at step 83, the system sends a query to the NAB Manager. Thereafter, at step 84, the system receives a response from the NAB Manager. Lastly, at step 85, the system presents the received response to the user. In some preferred embodiments, these functions are performed by the user's device, e.g., UE.

For further reference, FIG. 9 is a diagram showing method steps related to updating Content Information in a respective NAB according to some illustrative examples. As shown in FIG. 9, at step 90, the process starts. At step 91, the NAB Manager receives a signal from the UE (such as, e.g., described with reference to FIG. 8). Then, at step 92, the NAB Manager transfers CI between NABS of called and calling users (per user policies). Then, at step 93, the updated NAB is sent to the called and calling users per the user policies. In some preferred embodiments, these functions are performed by the NAB Manager.

FIG. 10 is a diagram showing method steps related to Content Information Discovery and Provision (Network Side) according to some illustrative examples. As shown at step 100, the system starts. At step 101, the NAB Manager receives a query from a UE. Then, at step 102, the system finds CI of a Subscriber in Question (SIQ) by, e.g., consulting various databases. Then, at step 103, the system sends an authorization message to the Subscriber in Question (such as, e.g., shown in FIG. 4). Then, the system determines at 104 if the SIQ is authorized. If the answer is "no," at step 107, the system informs that the user is declined. If the answer is "yes," the system forwards the desired CI at step 105. And, at step 106, the system updates the corresponding NABs. In some preferred embodiments, these functions are performed at the network side (e.g., by the NAB Manager).

1.3 UE-NAB Manager Interface

Figure 13:
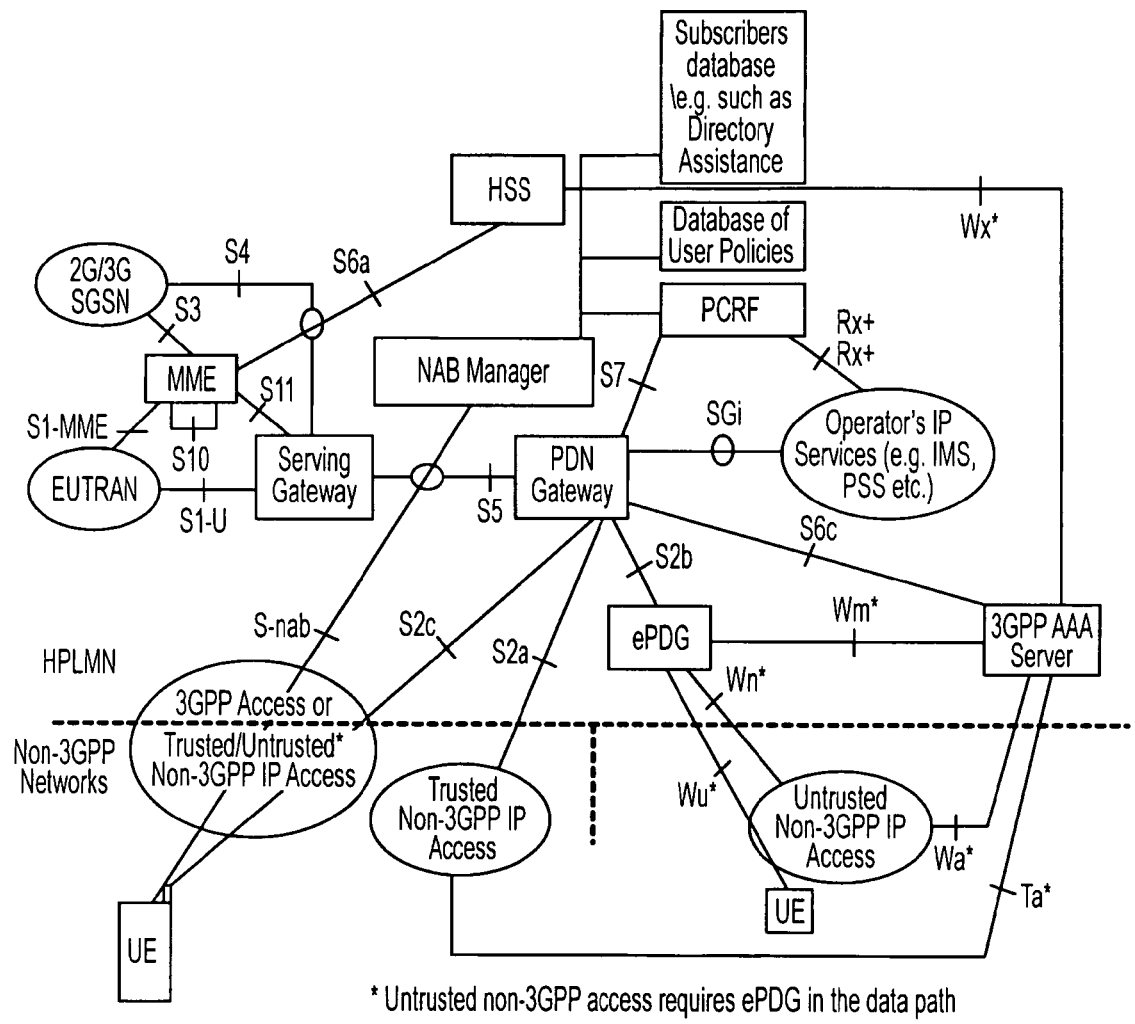
FIG. 13 is a diagram showing a NAB-Manager in SAE Architecture according to some illustrative examples (similar to that shown in FIG. 6)

In some preferred embodiments, a system for carrying out the present methods includes a direct interface or interfaces between a NAB Manger and the UE. In some preferred embodiments, this interface(s) is referred to as S-nab—see, e.g., the S-nab interface shown in FIG. 6 or in FIG. 13. This/these interface(s) is/are provided to carry communication between NAB Manger and the UE for certain tasks, such as, e.g., query/response messages for CID, synchronizing, downloading/uploading CI from to NAB to LAB, etc. In some illustrative and non-limiting embodiments, the protocols between NAB Manger and the UE could be the same as Sx recently approved by 3GPP for query/response on network discovery and selection in 3GPP TS-23.402. In other illustrative and non-limiting embodiments, it could be the same as defined in IEEE 802.21 for Network Discovery and Selection, or can be a suitable protocol defined by, e.g., the OMA group. Thus, in some illustrative examples involving 3GPP SAE architecture, the architecture could look as shown in FIG. 6 or in the alternative design shown in FIG. 13. For reference, SAE (System Architecture Evolution) is defined by the 3GPP, and its architecture includes, e.g., a mobility management entity (MME), a serving gateway, a PDN gateway, a home subscriber server (HSS), and a policy and charging rules function (PCRF). In this regards, the MME can form the SAE control core and process control signaling for, e.g., subscriber access, the service bearer layer, paging, and handover. In addition, the Serving Gateway can form an anchor point for handover between local base stations (e.g., E-Node Bs in SAE), and the serving gateway sends data between E-Node Bs and PDN gateways, provides a buffer for downlink data packages, and facilitates subscriber-oriented charging. In addition, the PDN gateway can forms a data bearer anchor, and it operates to perform packet forward, packet inspection, lawful interception, service-oriented charging, QoS control, and interconnection with non-3GPP networks. In addition, the HSS (Home Subscriber Server) can serve as a database for storing subscription data covering subscriber ID, security, location, and policy control. In addition, the PCRF is mainly used, e.g., for policy and charging controls, and determines service delivery policies and charging by analyzing subscribers' service and policy details, which it delivers to the corresponding entity for implementation.

In some embodiments, because the UE will be capable of having a direct access to NAB Manager for CID, the NAB Manager can be configured to be able to verify the status, location, capabilities and/or identity of a UE and to restrict CI to that UE according to user and/or network operator's policies, status, location and/or capabilities. Preferably, the UE will send a query directly to the NAB Manager for CID using higher layer data transport. Alternatively, the query/response between the UE and the NAB manager could be carried out through some other entity at the access network (AN).

In another embodiment of the present invention, obtaining and sharing knowledge about each other (e.g., other users) is also be extended to include Location of each other (e.g., the Network on which both are connected to at that point of time). Among other things, this could provide connection optimization. To that end, in some embodiments the NAB and the NAB Manager are configured to be capable of keeping track of which air (e.g., wireless) interface any user is attached to at any given point of time. An illustrative use case of this would include that it is very possible that both inquirer and SIQ could be in the same city or same location or even connected to the same network (e.g., WiFi).

In yet another embodiment, if the UE scans a Mobile Code and sends it to the operator's network for decoding, the decoded information (if desired by the user) can be stored in NAB for the time being (e.g., for a certain period of time or until the user has the access to a preferred (e.g., cheaper) access to the network to view and/or download the decoded information).

2.0 NAB Manager Capabilities for Some Exemplary Usage Scenarios

2.1. Number Portability

Based on the present invention, it is contemplated that a time will come when people will no longer preserve or memorize CI, but will click on an individual's name (e.g., a friend or the like) on soft Address Book displayed on a device and will get connected to that individual. This would not only facilitate the users in their management of CI, but would open various other usage scenarios and business opportunities (such as, e.g., in the illustrative instances described below).

The United States F.C.C. has mandated Number Portability (e.g., the ability to keep a telephone number while switching providers). It was introduced as a tool to promote competition in the heavily monopolized telecommunications industry. This has been attractive for consumers because they do not have to go through the hassle of distributing their new contact number to their relatives, acquaintances, friends, etc., in the event they change their service provider for improved services, for relocation of their household and/or the like.

On the other hand, according to some preferred embodiments, the system and architecture herein can offer, in a virtual way, the attributes of "Number Portability." For example, in some embodiments, where the NAB Manager takes the responsibility of distributing the new CI to other entities (e.g., to acquaintances, colleagues and buddies [with whom, e.g., the user had previously shared his CI]) and saves the subscribers from the hassle of distributing their new CI to their contacts (e.g., acquaintances, colleagues and buddies), the subscriber would have little need to care about number portability. The NAB manager can distribute the new CI to, e.g., the acquaintances and friends (with whom he had previously shared his CI) either transparently to the NAB user, or under notification to the NAB user as defined in his policy. In some preferred embodiments, the NAB Manger takes steps that would save a NAB user from annoyance, such as, e.g., steps including: (i) CI distribution authorized by the operator according to operator's policy; or (ii) CI distribution authorized by the NAB user according to NAB user's policy; or (iii) a combination thereof.

In addition, this could also offer operators a novel business opportunity as follows. As mentioned above, if the NAB Manager saves the subscribers from the hassle of distributing their new CI to their buddies (in this document, the term buddies refers broadly to any form of contact, whether friend, family, business, etc.), it will reduce the amount of Number Portability requests and, hence, will also result in considerable savings to operators. Notably, operators offer Number Portability as a service and charge for it (e.g., on a monthly basis). However, the revenue from this service is far less than the technical and administrative complexities posed by the Number Portability. For example, number portability is not possible if the number is to be ported outside the rate center (because it may involve roaming charges). Furthermore, in number portability the "donor network" provides the number and the "recipient network" accepts the number. The operation of donating a number requires that a number is "snapped out" from a network and "snapped into" the receiving network. If the subscriber ceases to need the number, then the original donor receives the number back and "snaps back" the number to its network. The situation becomes more complex if the user leaves the first operator for a second and then subsequently elects to use a third operator. In this case, the second operator will return the number to the first and then it is assigned to the third. Some other existing solutions also involve 3$^{rd}$ party services that charge the operators for offering Number Portability. However, once again, if the NAB Manager saves the subscribers from the hassle of distributing their new CI to their buddies, etc., it will reduce the volume of Number Portability requests.

2.2. United States National Do-Not-Call Registry

Referring to FIG. 1, in some embodiments, the NAB User Interface can also be enhanced to contain an option asking, e.g., the user whether or not he would like his CI to be shared with certain 3$^{rd}$ parties, such as, e.g., advertisers, salespersons, and/or telemarketers. For those who indicate their interest for sharing their CI and that are open to receiving such telemarketing or the like calls, for them a complete portfolio of policies can also be created indicating, e.g., time periods (e.g., days, times, etc.) they would accept to be called, a category or field of interest on which they would accept to be called, the location at which they would accept to be called, and/or the like. In some embodiments, the users could also choose to cease to be called for a time period or at any time. Thus, the NAB Manager could generate a list of such users, could make classified directories and could make them available to the telemarketers who have subscribed for such a service on a real time basis. This would not only generate a business case for operators, telemarketers, etc., but it would also do so for users. That is, the users can, thus, receive some incentives from the operators or Telemarketing Company in the form of discount coupons, etc., that the users actually desire. Very notably, this would also eliminate the need for a "United States National Do Not Call Registry" which was intended to give U.S. consumers an opportunity to limit the telemarketing calls they receive. The whole scenario, presented here, can make telemarketing a pleasant experience for everyone—including users (who can receive calls limited to categories, times, etc., that they select based on user preferences), telemarketers and operators.

2.3. 411 Directory Assistance

As indicated above, if a person's new CI is automatically distributed to those with whom he had shared his information, it would reduce the need of, e.g., creating, recording and managing such a change on an old number or to provide other methods of sharing such information. In addition, the present invention could also greatly reduce traffic on 411 Directory Assistance calls by providing information that may be desired.

In some embodiments, for example, a user could have policy settings that, e.g., allow certain information to be shared openly and publicly to any and all entities, as opposed to assigning information on a per user basis. Additionally, in some embodiments, user policy settings could involve enablement of allowing certain information to be shared based on, e.g., a category or class of entity (such as, e.g., sharing certain information with all users in a certain location, within a particular organization, under a certain network operator, having a particular last name or the like).

2.4 The NAB Storage Capacity

In some embodiments, if data storage capacity is an issue, when the storage capacity of the NAB is about to be exhausted, a notification asking "would you like to enhance the storage capacity" is preferably sent to the NAB user. In addition, it can further send the cost information for the storage enhancement. In this manner, the NAB Manager has the capability to enhance NAB's storage capacities on user's request and per operator's policies. In some embodiments, based on the user's input, it can delete the information on the basis of "Least Used First Delete (LUFD). In some embodiments, owing to limited storage capacity in the LAB, the NAB can also stop automatic synchronism of NAB and LAB so that the CI on the LAB is not deleted. In some embodiments, the NAB can also compress the data to enhance the capacity to some extent.

2.5 The NAB's Selective Synchronism

In some embodiments where the storage capacity of the LAB (e.g., on a user device) is less than the storage capacity of the NAB, the NAB Manager is preferably capable of offering selective synchronism of the NAB contents with LAB (e.g., without modifying the contents in the NAB). Preferably, under this situation the menu shown in FIG. 14 would be presented to the NAB user and based on the user's input, the information in the LAB would be stored.

2.6. Accessing NAB from Unregistered Device (e.g. Public Phone)

When the user is not in the possession of any of his registered devices (e.g. does not carry any of his own devices—such as, e.g., forgetting a device at home), and he has to depend on the public device or a friend's device to make a call to a friend whose CI is not memorized by the user or not available at that time, the device should be capable of presenting a menu similar to that shown in FIG. 15. Thus, in some embodiments the NAB user can retrieve the CI of any his contacts from his own NAB to establish a contact with his friend using public devices/borrowed devices. The NAB Manager is, thus, capable of verifying the identity of the NAB user (such as, e.g., by entry of a user name and password) and also searching his desired information. In this manner, it can search for the desired information within one NAB (in addition to searching CI by contacting other databases in the network).

3.0 Benefits

In the preferred embodiments, a new architecture is presented that can provide a variety of noteworthy benefits over existing systems.

As some examples, the preferred embodiments can eliminate the need of "Number Portability," of "United States National Do Not Call Registry" and/or of "411 Directory Assistance."

In addition, while 411 type of Directory Assistance is limited within a region or country, the CID proposed in this application could be extended at a global level. In such cases, this can be performed via inter-operators agreements.

In addition, 411 type of Directory Assistance does not seek the authorization of Subscriber in Question (SIQ). However, the CID system and method of the preferred embodiments honors the SIQ's privacy and denies or allows sharing of the amount of information SIQ wants to share (which can be readily modified and/or changed by the user as desired over time). In contrast to 411 type of Directory Assistance, the preferred embodiments herein can, e.g., provide a very dynamic and configurable system that provides CI tailored to the needs of users in a dynamic and modifiable manner.

The Subscriber in Question (SIQ) and Inquirer or NAB Manager and Inquirer can also be made capable of obtaining and sharing more knowledge about the inquirer before the actual Contact Information is provided to the inquirer. This can also be used to address, by way of example, a scenario in which, e.g., more than one individual or entity have similar names, are found in the same city, etc. Notably, some of these features are not possible in 411 Directory Assistance.

In addition, in some embodiments, the NAB could be adapted to keep location information and also the track of which air interface any user is attached to, such that connection optimization can be achieved—because, e.g., there is a probability that both inquirer and SIQ (or caller and called party) both are in the same location (e.g., some region or city) or even connected to the same network (e.g., WiFi).

In some embodiments, as noted, the NAB can be enhanced to contain an option, e.g., to ask the user if he would like his CI to be shared with Telemarketers or not, whereby telemarketing can be made a pleasant experience for users, telemarketers and operators.

The above noted use cases are exemplary and non-limiting examples. It should be appreciated that the NAB Management architecture presented in this application can be used to resolve these problems that stem from managing subscribers contact information. It can be used to offer all those services that revolve around such user contact information.

While the various embodiments described above discuss Contact Information in the form of addresses, telephone numbers, names, etc., in various embodiments Contact Information can include any other form of Content Information. By way of example, such information can include, e.g., a) schedule information (e.g., classes, activities, events), b) calendar information, c) news information, d) interests information, e) information related to needs or requests, f) information related to goods or services, g) information related to pricing, qualifications, h) electronic document, image, audio, video and other files, etc. In the present application, the terminology Address Book, including, e.g., Network Address Book, encompasses, e.g., storage of all types of Content Information, including, e.g., address information and/or other information. However, the preferred embodiments would include the storage of address and contact information (e.g., including telephone numbers).

3.1 Other Embodiments a. Content Information Includes NAB Contacts Visibility

In some preferred embodiments, a user's NAB information, including various contact information of other persons, entities, etc., in the user's NAB can be made available to other users on a selective basis. By way of example, in addition to allowing a user to enter policies related to the visibility or transfer of data related to that user's own personal contact information, the user can enter policies related to the visibility or transfer of data related to Content Information of that user pertaining to other persons or entities within that user's address book. In the preferred embodiments, whether or not such Contact Information of said other parties are made available or transferred from the user's address book would also be driven based on the permissionning provided by such other parties. By way of example, a user could have one or more of the following policy choices in some embodiments related to contact information of others within that user's NAB:

1) Disclose contact information of others in NAB accordance to each individual's policies;

2) Disclose contact information of others in NAB accordance to each individual's policies, but cellular telephone number;

3) Disclose contact information of others in NAB accordance to each individual's policies, but only to entities identified in a category of friends verses business; etc.

In this manner, a user can quickly update their NAB by identifying information of other mutual acquaintances, etc., contained within other's NABs. And, this information can be managed so as to provide selective visibility to only a subset of contacts based on, e.g., that user's permissionning and/or the permissionning of the parties in that user's NAB.

b. Content Information Includes Plan and/or Interface Visibility

In some embodiments, a user's NAB can be adapted to display information related to, e.g.:

1) that user's service provider plan (e.g., phone plan), such that other's can ascertain the best times or methods to call (e.g., based on costs at the recipient's side [i.e., as a favor on a friendly basis], based on costs charged by their service provider [e.g., which can involve increases between providers and at certain times, etc.]);

2) the interfaces available to that user (such as, e.g., WLAN, cellular, etc.) and/or the interfaces to which that user is connected at a particular time. By way of example, one's NAB can be adapted to have this information input by the user, or it can be adapted to automatically update this information based on availability or connectivity of that interface.

In some embodiments, if a user is, e.g., connected to VERIZON™, a VERSIZON icon can be displayed to others that obtain data related to that user's NAB transferred. In some embodiments, this can also serve as a mechanism for companies, like VERIZON, to engage in marketing of their plan (e.g., by presenting a short advertisement, coupon code or the like).

c. Date Stamping of Content Information

In some embodiments, a user's CI in their NAB can include time or date stamping of information, such as, e.g., of a user's contact information. In this manner, e.g., where there are discrepancies (such as, e.g., if another individual has contact information related to another individual with a different or more recent time stamp, the system and identify the discrepancy to enable updating of the information. By way of example, if another parties information is more recent (or, in other embodiments, otherwise differs for any reason), a pop-up window or other selection mechanism can be presented to a user for the user to indicate whether or not they will, e.g., a) over-ride their old information with the new information, b) combine both bits of information (e.g., listing two addresses or the like under one contact), etc. In some embodiments, a user can also be presented with priority schemes based on context, such as, e.g., 1) the source of the information and/or 2) dates of the information. By way of example, in some embodiments, a user can select as a policy to automatically have newer information over-ride older information (or, older information of more than a certain age limit). However, it is anticipated that automatic over-riding of contact information would likely be used on a limited basis (such as, e.g., by allowing a school's contact information related to other students in a class override prior contact information [e.g., knowing that student's addresses change yearly and that the school would likely have accurate information, etc.]).

d. Content Information Including Geographic Location and/or Present Activity

In some embodiments, a user's present location can be included (either manually entered or automatically uploaded) in the NAB, and observable by others with access to their NAB information. In some embodiments, a table or chart can be presented displaying where the user is located, and also whether the user is available or not. As such, a user's contacts can have a clear picture of the user's location, and can discern the best way to contact them, the best reasons to contact them (e.g., to have lunch if they are nearby, etc.).

In some embodiments, a user's permissionning and policies can be adapted to be based on the user's location. By way of example, a user can, e.g., decide to deny contact when they are taking an examination, at work, or at the movies. Or, a user can, e.g., deny contact from certain persons when they are at certain locations, such as, e.g., from their employer over the weekend, etc. In some preferred embodiments, location can be based on GPS technology, while in other embodiments it can be based on other approximations, by user input, and/or any other means for identification of specific or general locations.

In some embodiments, similar to this geographic information, the user would be capable of customizing each individual contact to provide certain levels of permissionning and visibility of their contact information, etc., other "present-state" information can be provided that can be similarly used in permissionning. For example, in some embodiments, a user A can identify to his contact-B that the user-A is away, and a user A can identify to his contact-C that the user-A is busy, and a user A can identify to his contact-C that the user-A is unavailable, and a user A can identify to his contact-D that the user-A is offline etc, some other tasks that one can be engaged in and can be displayed to the others could to help other's to know when or how to call, etc., are such as, e.g., if they are a) sleeping, b) at the beach, c) watching a movie, d) sick in bed, etc.

In some embodiments, a user's NAB information can also include some items of interest or desire (such as, e.g., encouraging others to contact them), like "Its Friday night, call if you are going downtown tonight!" And, conveniently, this type of information could be made available to, e.g., individuals identified as friends, as opposed to employers, parents, etc., in some examples.

Thus, in various embodiments of the present invention, a NAB can be provided that has a very useful permissions-based/visibility-limiting scheme to provide information to certain subsets of users based on, e.g., geographic location, interface (e.g., WLAN, etc.), status, etc.

4.0 Additional Examples and Use Cases

Architecture:

This section sets forth some illustrative requirements according to some illustrative embodiments employing a Converged Address Book (CAB). A Converged Address Book is a work item of the messaging working group of the Open Mobile Alliance (OMA). The terminology Converged Address Book signifies that the address book can be shared by multiple devices operated by a user. A Converged Address Book can be the same or analogous to a Network Address Book described above. In some embodiments, aspects of the present invention can be employed to improve such a CAB feature and the user experience related thereto. The illustrative examples described below pertain to populating the CAB, to using the CAB architecture for Directory Assistance and/or to using the CAB architecture for Telemarketing. This section also sets forth some requirements for Extending CAB Storage Capacity, CAB and LAB Selective Synchronism, and Accessing CAB from Unregistered Devices.

4.1. Populating the CAB

In preferred embodiments, a CAB enabler is configured to populate the CAB in an optimized way and with efficient usage of air (wireless) resources.

Preferably, the CAB enabler is capable of populating the CAB at the end of a call received from a new caller (whose contact information does not exist in the user's CAB) per CAB user policy and preference.

4.2. CAB for Directory Assistance

The CAB enabler is preferably capable of providing contact information of an under-query CAB user to a querying-CAB user with the permission of the under-query CAB user.

4.3. Extended the CAB for Marketing

The CAB enabler is preferably capable of providing the user's interest-based information from a user's extended CAB to the 3$^{rd}$ party queries, per the CAB user's consent and the operators' polices.

4.4. Extending the CAB Storage Capacity

The CAB enabler is preferably capable of enhancing CAB's storage capacity on the user's request and per the operator's policies. In some preferred embodiments, if a CAB storage limit is completely exhausted (e.g., the user's CAB storage capacity is filled to capacity) and a new entry is still desired, the CAB enabler is capable of deleting certain information (such as, e.g., the least-used information) from the CAB with the CAB user's consent.

4.5. CAB and LAB Selective Synchronism

The CAB enabler is preferably capable of synchronizing certain limited (e.g., preferred) fields or portions of the contents therein in circumstances wherein a Local Address Book (LAB) storage capacity is not large enough to accommodate all of the contents of the CAB. In some embodiments, the user can select such preferred fields or portions.

4.6. Accessing the CAB from Unregistered Devices

The CAB enabler is preferably capable of providing a CAB user access to his own CAB through a public and/or borrowed device after CAB user identity verification (e.g., user name and password and/or other identity verification).

Use Cases:

The following paragraphs set forth a number of illustrative use case scenarios according to some illustrative examples employing a CAB. A first Use Case-1 involves querying a network about the contact information. A second Use Case-2 involves populating the CAB. And, a third Use Case-3 relates to CAB-based telemarketing.

4.7 Use Case 1

This Use Case is described in reference to an illustrative example. Here, consider that Alice receives a call from Bob (i.e., who is a first-time caller). After the end of the call, Bob's device, as well as Alice's device present them with a respective "choice menu" if they want to save the contact information (e.g., of the new caller "Bob" and of the new callee "Alice") in their CABs. They are also asked how much information (e.g. personal, business and/or other information items, etc.) they want to share in each other'CAB. Based on their choice of selection, the desired information is shared between the CABs.

In some embodiments, for an improved user experience, Alice and Bob can set their preferences to limit the frequency of such choice offerings. Thus, if the default policy is to save new callers' contact, the contact information can be saved automatically and transparently. Thus, in some embodiments, their devices can be set to automatically save all new contact information or to automatically save certain contact information based on policies (such as, e.g., user location, name, etc.). Similarly, if the default policy is to not to save new callers' contact, the contact information will not be saved).

4.8 Use Case 2

This Use Case is described in reference to another illustrative example. Consider that Alice is looking for Contact Information of her friend Bob. Preferably, her UE is capable of presenting her with a query menu. Alice fills in the maximum information she knows (e.g., First Name, Last Name, and City, etc.) and clicks "Get Contact Information." This action sends a query to the network. The network searches Bob's contact information (in CABs) and after finding Bob's contact information either looks for or requests Bob's permission or his default policy stored in his CAB. Based on the result of such permission or policy, Alice receives either Bob's contact information or receives a message from the network that information delivery to Alice is denied.

4.9 Use Case 3

An advertiser and/or marketer "Charlie" wants to know individuals that are interested in X-BRAND cosmetics in a particular area. Charlie (who has subscribed for such service) sends a query to the network. Since Alice has specified in her extended CAB about X-BRAND of cosmetics (i.e., Alice either specifically identifies X-BRAND or X-BRAND falls within a type or category of advertised and/or marketer that Alice approves), her name is returned to Charlie. Alice may also create a portfolio or profile indicating, day and/or time she will accept to be called to receive information and/or advertisements about x-brand. In preferred embodiments, Alice can change her position in relation to an entity or category of entities at different times. For example, a week later, Alice could change her interest about X-BRAND of cosmetics, such that, at that time, Charlie would not receive her name and contact information.

4.10 The CAB Storage Capacity

This Use Case is described in reference to another illustrative example. Consider that Alice uses her CAB a lot and its capacity is about to be exhausted. In some embodiments, Alice can receive a notification from the network or network operator asking if she would like to purchase additional storage capacity. Based on her input and operator's policy, the network can either enhance (e.g., increase) her CAB's storage capacity, or can delete certain existing information (e.g., least used or otherwise selected or identified information) with Alice's consent.

4.11 The CAB's Selective Synchronism

This Use Case is described in reference to another illustrative example. Consider that Alice's handheld device has a limited storage capacity (e.g., less than that of her CAB). In some embodiments, she can send a message to the network for selective contents synchronization of the CAB with her LAB. For example, in some embodiments, the CAB would be configured to synchronize her LAB with the preferred fields or portions of the contact information (such as, e.g., personal phone numbers only, or business phone numbers only).

4.12 Accessing CAB from an Unregistered Device (e.g. Public Phone)

This Use Case is described in reference to another illustrative example. Consider an example in which Alice is not in the possession of any of her registered devices (such as, e.g. if she forgot her device at home), and she has to depend on the public or borrowed device to make a call. She does not have contact information available at that time (e.g., the public or borrowed device does not contain her LAB). For example, she may have borrowed her friend Bob's device, but the LAB, thus, belongs to Bob. In this situation, Bob's device preferably presents a menu where she can enter her own personal CAB address, her ID and pass-code to access her own CAB to retrieve the desired contact from her own CAB.

5.0 Illustrative Architecture

Figure 11:
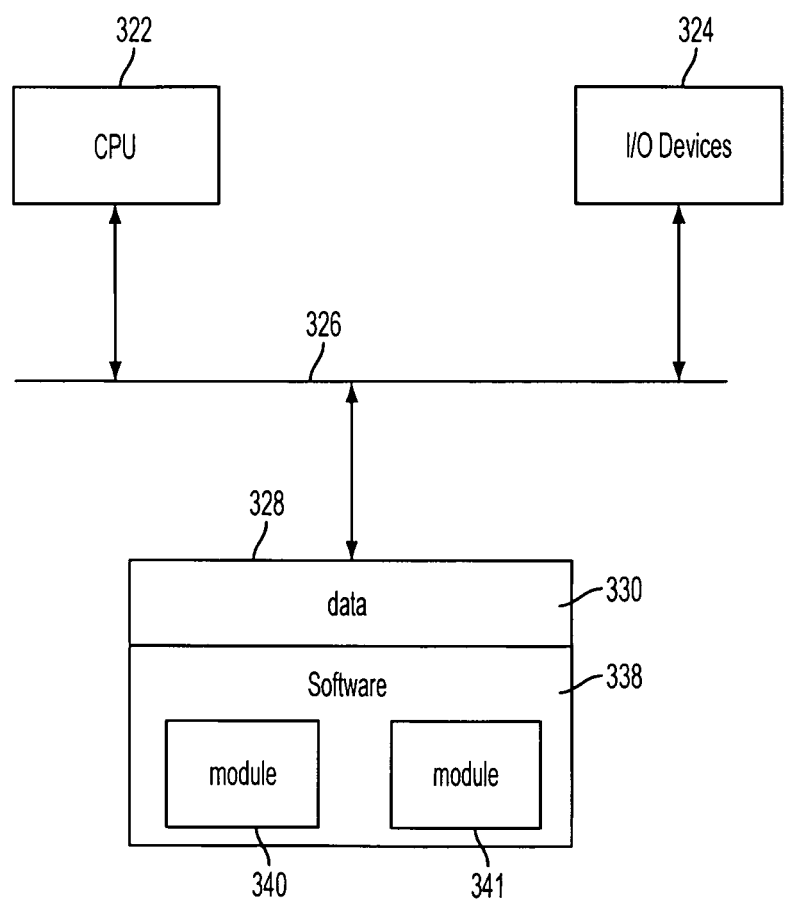
FIG. 11 shows illustrative computer architecture that can be employed to carry out method steps according to some implementations.

FIG. 11 shows an illustrative computer or control unit that can be used to implement computerized process steps, to be carried out by devices, such as, e.g., a Network Access Manager, a device, etc., in some examples. Some illustrative user devices (such as, e.g., cell phones) can include, e.g., some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.). In addition, illustrative NABs can include, e.g., some or all of the following components: a network interface linked to a wireline network, and a wireless transceiver in communication with the user devices (for example, the wireless transceiver can include an antenna for radio or microwave frequency communication with the user devices), as well as a processor, a program memory, and a random access memory. In some examples, the computer or control unit includes a central processing unit (CPU) 322, which can communicate with a set of input/output (I/O) device(s) 324 over a bus 326. The I/O devices 324 can include, for example, a keyboard, monitor, and/or other devices. The CPU 322 can communicate with a computer readable medium (e.g., conventional volatile or non-volatile data storage devices) 328 (hereafter "memory 328") over the bus 326. The interaction between a CPU 322, I/O devices 324, a bus 326, and a memory 328 can be like that known in the art. Memory 328 can include, e.g., data 330. The memory 328 can also store software 338. The software 338 can include a number of modules 340 for implementing the steps of processes. Conventional programming techniques may be used to implement these modules. Memory 328 can also store the above and/or other data file(s). In some embodiments, the various methods described herein may be implemented via a computer program product for use with a computer system. This implementation may, for example, include a series of computer instructions fixed on a computer readable medium (e.g., a diskette, a CD-ROM, ROM or the like) or transmittable to a computer system via and interface device, such as a modem or the like. A communication medium may be substantially tangible (e.g., communication lines) and/or substantially intangible (e.g., wireless media using microwave, light, infrared, etc.). The computer instructions can be written in various programming languages and/or can be stored in memory device(s), such as semiconductor devices (e.g., chips or circuits), magnetic devices, optical devices and/or other memory devices. In the various embodiments, the transmission may use any appropriate communications technology.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A system for the management of network address books, comprising:
   a network address book (NAB) manager including a processor, a transceiver and data storage within a core network,
   said NAB manager being configured to manage network storage of content information of a plurality of users, wherein content information corresponding to respective ones of said plurality of users is stored in separate NABs in data storage;
   said NAB manager being configured to populate said data storage within said separate NABs with content information received from user devices;
   said NAB manager being configured to transmit at least some of said content information obtained from a first NAB in data storage that is associated with a first user, based on authorization of the first user, to another NAB in a second data storage that is located within said core network or within another network and that is associated with a second user; and
   said NAB manager being configured to receive a query from the second user for information related to the first user and to obtain said information from said first NAB without burdening wireless traffic by requiring wireless communications from individual wireless user devices;
   wherein said NAB manager is configured to receive user Contact Information Discovery queries from individuals via wireless user devices and to transmit said information based on user authorization, and wherein said NAB manager is configured such that in response to such queries from wireless user devices Contact Information is transmitted from one NAB to another NAB based on said user authorization via a wireline connection;
   further including said NAB manager being configured to provide a plurality of levels of settings governing how much information is transmitted from said one NAB to said another NAB based on the user selecting certain of said settings so as to designate how much information the user wants to share with other users, said levels of settings governing how much information is transmitted from said one NAB to said another NAB including personal information and business information settings;
   further including said NAB manager being configured to provide selective synchronization between a Network Address Book of a user stored in the core network and a Local Address Book (LAB) in a user device of the user such that the NAB Manager will transmit only certain fields or portions of content information data contained within the user's NAB to the LAB in the user device for which a user selection has been received in order to accommodate limited storage capacity of the LAB; and
   where said NAB manager is configured to store information within a user's NAB related to the location of the user and wherein said NAB manager is configured to enforce user policies based on the location of the user, including denying contact from a specified user based on a location policy.

2. The system of claim 1, wherein said core network is a cellular telephone network.

3. The system of claim 1, further including an Intra-NAB manager responsible for the management of NABs within one operator's network.

4. The system of claim 1, further including an Inter-NAB manager configured to communicate with NAB managers across different operator's network.

5. The system of claim 1, wherein said NAB manager is adapted to accommodate policies for verification of service access privileges.

6. The system of claim 1, wherein said NAB manager is adapted to accommodate policies for verification of end-user preference.

7. The system of claim 1, wherein said NAB manager is adapted to accommodate policies for verification of personalization.

8. The method of claim 1, further including said NAB manager accommodating policies for verification of personalization.

9. The system of claim 1, where said NAB manager is configured to store information within a user's NAB related to the interfaces available to the user.

10. The system of claim 1, where said NAB manager is configured to store information within a user's NAB related to the interfaces to which the user is connected.

11. The system of claim 10, where said NAB manager is configured to store information within a user's NAB related to the location of the user and wherein said NAB manager is configured to enforce user policies based on the location of the user, including denying contact from a specified user based on a location policy.

12. A method for the management of network address books, comprising:
   a network address book (NAB) manager managing network storage of content information in a plurality of network address books of a plurality of users;
   each said NAB having data storage with populated content information from at least one user device;
   said NAB manager managing the receipt of information from a user related to sharing of at least some of said information with at least one other user;
   said NAB manager providing at least some of said information for said at least one other user;
   said NAB manager transmitting said at least some of said information obtained from a first data storage of a first of said NABs associated with a first user, based on authorization of the first user, via said core network or across networks to a second data storage of a second of said NABs associated with a second user;
   said NAB manager receiving a query from the second user for information related to the first user, and said NAB manager obtaining said information from said first NAB without burdening wireless traffic by requiring wireless communications from individual wireless user devices, wherein said NAB manager transmits said information to said second NAB via a wireline connection;
   said NAB manager receiving user Contact Information Discovery queries from individuals via wireless user devices and to transmit said information based on user authorization, and wherein in response to such queries from wireless user devices said NAB manager causes Contact Information to be transmitted from one NAB to another NAB based on said user authorization via a wireline connection;
   further including said NAB manager providing a plurality of levels of settings governing how much information is transmitted from said one NAB to said another NAB based on the user selecting certain of said settings so as to designate how much information the user wants to share with other users, said levels of settings governing how much information is transmitted from said one NAB to said another NAB including personal information and business information settings;

further including said NAB manager providing selective synchronization between a Network Address Book of a user stored in the core network and a Local Address Book (LAB) in a user device of the user such that the NAB Manager will transmit only certain fields or portions of content information data contained within the user's NAB to the LAB in the user device for which a user selection has been received in order to accommodate limited storage capacity of the LAB; and where said NAB manager is configured to store information within a user's NAB related to the location of the user and wherein said NAB manager is configured to enforce user policies based on the location of the user, including denying contact from a specified user based on a location policy.

13. The method of claim 12, further including said core network being a cellular telephone network.

14. The method of claim 12, further including an Intra-NAB manager responsible for the management of NAB within one operator's network.

15. The method of claim 12, further including an Inter-NAB manager communicating with NAB managers across different operator's network.

16. The method of claim 12, further including said NAB manager accommodating policies for verification of service access privileges.

17. The method of claim 12, further including said NAB manager accommodating policies for verification of end-user preference.

18. The method of claim 12, where said NAB manager communicates with another NAB manager using wireline communications.

19. The method of claim 12, further including said NAB manager transmits at least some of said information for said first user automatically based on prior authorization of the first user to said second NAB located within said core network or within another network and that is associated with said second user.

20. The method of claim 12, wherein said NAB manager is configured to communicate with a plurality of other NAB managers to find information in response to said query.

21. The method of claim 12, wherein each of said NAB managers is a fixed network node located within a network and wherein said user and said another user include wireless devices connectable to said networks.

22. The method of claim 12, wherein said NAB Manager is configured to enable users to enter policies related to providing of their content information to telemarketers, including limitations related to categories, times or locations.

23. The method of claim 22, further including providing users financial incentives for selecting policies allowing providing of their content information to telemarketers.

24. A method for the management of a network address book, comprising:

a network address book (NAB) manager managing network storage of content information in a plurality of network address books of a plurality of users;

each said NAB having populated content information from at least one user device;

said NAB manager managing the receipt of information from a user related to sharing of at least some of said information with at least one other user;

said NAB manager providing at least some of said information for said at least one other user;

said NAB manager transmitting said at least some of said information for said at least one other user, based on authorization of the user, via said core network or across networks to another NAB manager associated with said other user;

said NAB manager receiving a query from a user for information related to at least one other user, and said NAB manager communicating with said another NAB manager and obtaining said information from said another NAB manager without burdening wireless traffic by requiring wireless communications from individual wireless user devices, wherein said NAB manager transmits said information to said another NAB manager via a wireline connection;

said NAB manager receiving user Contact Information Discovery queries from individuals via wireless user devices and to transmit said information based on user authorization, and wherein in response to such queries from wireless user devices said NAB manager causes Contact Information to be transmitted from one NAB to another NAB based on said user authorization via a wireline connection;

further including said NAB manager being configured to provide a plurality of levels of settings governing how much information is transmitted from said NAB manager to said another NAB manager based on the user selecting certain of said settings so as to designate how much information the user wants to share with other users, said levels of settings governing how much information is transmitted from said one NAB to said another NAB including personal information and business information settings;

further including said NAB manager providing selective synchronization between a Network Address Book of a user stored in the core network and a Local Address Book (LAB) in a user device of the user such that the NAB Manager will transmit only certain fields or portions of content information data contained within the user's NAB to the LAB in the user device for which a user selection has been received in order to accommodate limited storage capacity of the LAB; and where said NAB manager is configured to store information within a user's NAB related to the location of the user and wherein said NAB manager is configured to enforce user policies based on the location of the user, including denying contact from a specified user based on a location policy.

* * * * *

UNITED STATES PATENT AND TRADEMARK OFFICE
CERTIFICATE OF CORRECTION

PATENT NO. : 9,098,833 B2
APPLICATION NO. : 12/365758
DATED : August 4, 2015
INVENTOR(S) : Yaqub It is certified that error appears in the above-identified patent and that said Letters Patent is hereby corrected as shown below:

IN THE DRAWINGS

In Fig. 12, Sheet 8 of 10, delete "No Informaiton" and insert -- No Information --, therefor.

In Fig. 14, Sheet 10 of 10, delete "No Informaiton" and insert -- No Information --, therefor.

IN THE SPECIFICATION

In Column 1, Line 39, delete "(NAB))." and insert -- (NAB). --, therefor.

In Column 4, Line 45, delete "(I.e" and insert -- (i.e --, therefor.

In Column 4, Line 53, delete "(i.e. e.g." and insert -- (e.g. --, therefor.

In Column 5, Line 31, delete "(BPI):" and insert -- (BFI): --, therefor.

In Column 5, Line 49, delete "a or message (such" and insert -- or message such --, therefor.

In Column 5, Line 67, delete "e.g.;" and insert -- e.g.: --, therefor.

In Column 6, Line 8, delete "time" and insert -- time. --, therefor.

In Column 7, Line 22, delete "Contact)" and insert -- Contact --, therefor.

In Column 7, Line 23, delete "CID)." and insert -- CID)). --, therefor.

In Column 7, Line 47, delete "Question's" and insert -- Questions --, therefor.

In Column 8, Line 1, delete "(I.e" and insert -- (i.e --, therefor.

In Column 8, Line 9, delete "(i.e. e.g." and insert -- (e.g. --, therefor.

In Column 12, Line 1, delete ""Least" and insert -- Least --, therefor.

Signed and Sealed this
Sixteenth Day of February, 2016

Michelle K. Lee
*Director of the United States Patent and Trademark Office*

CERTIFICATE OF CORRECTION (continued)
U.S. Pat. No. 9,098,833 B2

IN THE SPECIFICATION

In Column 14, Line 15, delete "VERSIZON" and insert -- VERIZON --, therefor.

In Column 14, Line 25, delete "(such" and insert -- such --, therefor.

In Column 16, Line 38, delete "other'CAB." and insert -- other' CAB. --, therefor.

In Column 16, Line 50, delete "saved)." and insert -- saved. --, therefor.

IN THE CLAIMS

In Column 20, Line 18, in Claim 8, delete "method" and insert -- system --, therefor.

In Column 20, Line 21, in Claim 9, delete "where" and insert -- wherein --, therefor.

In Column 20, Line 24, in Claim 10, delete "where" and insert -- wherein --, therefor.

In Column 20, Line 27, in Claim 11, delete "where" and insert -- wherein --, therefor.

In Column 21, Line 38, in Claim 18, delete "where" and insert -- wherein --, therefor.